(12) United States Patent
Jangbarwala

(10) Patent No.: US 8,314,044 B2
(45) Date of Patent: Nov. 20, 2012

(54) FIBROUS COMPOSITE CATALYTIC STRUCTURES AND THEIR USE IN CHEMICAL REACTORS

(76) Inventor: Juzer Jangbarwala, Brea, CA (US)

( * ) Notice: Subject to any disclaimer, the term of this patent is extended or adjusted under 35 U.S.C. 154(b) by 1495 days.

(21) Appl. No.: 11/893,829

(22) Filed: Aug. 17, 2007

(65) Prior Publication Data

US 2012/0077664 A1 Mar. 29, 2012

(51) Int. Cl.
*B01J 21/18* (2006.01)
*B01J 23/00* (2006.01)
*B32B 3/02* (2006.01)
*B32B 15/00* (2006.01)
*B32B 33/00* (2006.01)
*B32B 17/12* (2006.01)
*B32B 18/00* (2006.01)
*B32B 3/26* (2006.01)
*B32B 5/16* (2006.01)
*B32B 9/00* (2006.01)
*B32B 15/14* (2006.01)
*B32B 5/26* (2006.01)
*B32B 27/04* (2006.01)
*B32B 27/12* (2006.01)
*D04H 11/00* (2006.01)
*D04H 1/00* (2006.01)
*D03D 27/00* (2006.01)
*D03D 9/00* (2006.01)
*D03D 15/00* (2006.01)
*D03D 19/00* (2006.01)
*D05C 17/00* (2006.01)

(52) U.S. Cl. .......... 502/182; 428/87; 428/96; 428/293.4; 428/293.7; 428/304.4; 428/323; 428/364; 428/367; 428/372; 428/379; 442/5; 442/20; 442/21; 442/31; 442/35; 442/38; 442/50; 442/51

(58) Field of Classification Search ............... 428/87, 428/96, 293.4, 293.7, 304.4, 323, 364, 367, 428/372, 379; 442/5, 20, 21, 31, 35, 38, 442/50, 51; 502/182
See application file for complete search history.

(56) References Cited

U.S. PATENT DOCUMENTS

| 5,102,745 A * | 4/1992 | Tatarchuk et al. ............ 428/605 |
| 5,304,330 A * | 4/1994 | Tatarchuk et al. ............... 419/2 |
| 5,643,670 A * | 7/1997 | Chung .......................... 428/367 |
| 6,390,304 B1 * | 5/2002 | Wilson et al. ................. 210/491 |
| 6,495,258 B1 * | 12/2002 | Chen et al. .................... 428/408 |
| 7,833,316 B2 * | 11/2010 | Tatarchuck et al. ............ 95/135 |
| 2003/0194362 A1 * | 10/2003 | Rogers et al. ................ 422/222 |
| 2004/0097371 A1 * | 5/2004 | Jangbarwala ................. 502/439 |
| 2005/0229489 A1 * | 10/2005 | Bavarian et al. ............. 48/198.7 |

FOREIGN PATENT DOCUMENTS

CN 1792448 * 6/2006

OTHER PUBLICATIONS

"Production of hydrogen by catalytic reforming of dimethoxymethane over bifunctional catalysts," Yuchuan Fu et al. Journal of Catalysis 248 (2007), pp. 101-110.*

* cited by examiner

Primary Examiner — Patricia L Hailey
(74) Attorney, Agent, or Firm — Henry E. Naylor

(57) ABSTRACT

Permeable composite fibrous catalytic sheets comprised of at least three distinct solid phases. A first solid phase is an electrically conductive phase comprised of randomly oriented electrically conductive carbon fibers. A second solid phase is a 3-dimensional porous network of a non-conductive porous ceramic material. A third phase is comprised of catalytic particles dispersed on said 3-dimensional porous network.

36 Claims, 9 Drawing Sheets

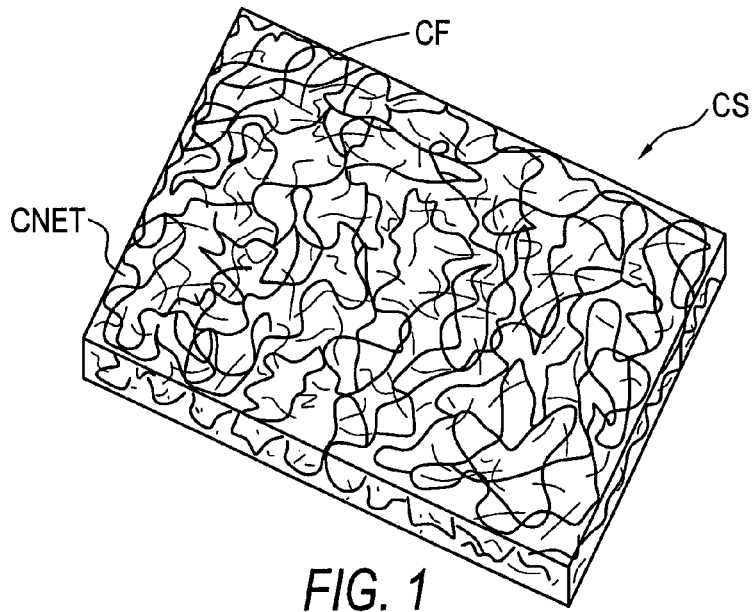
FIG. 1
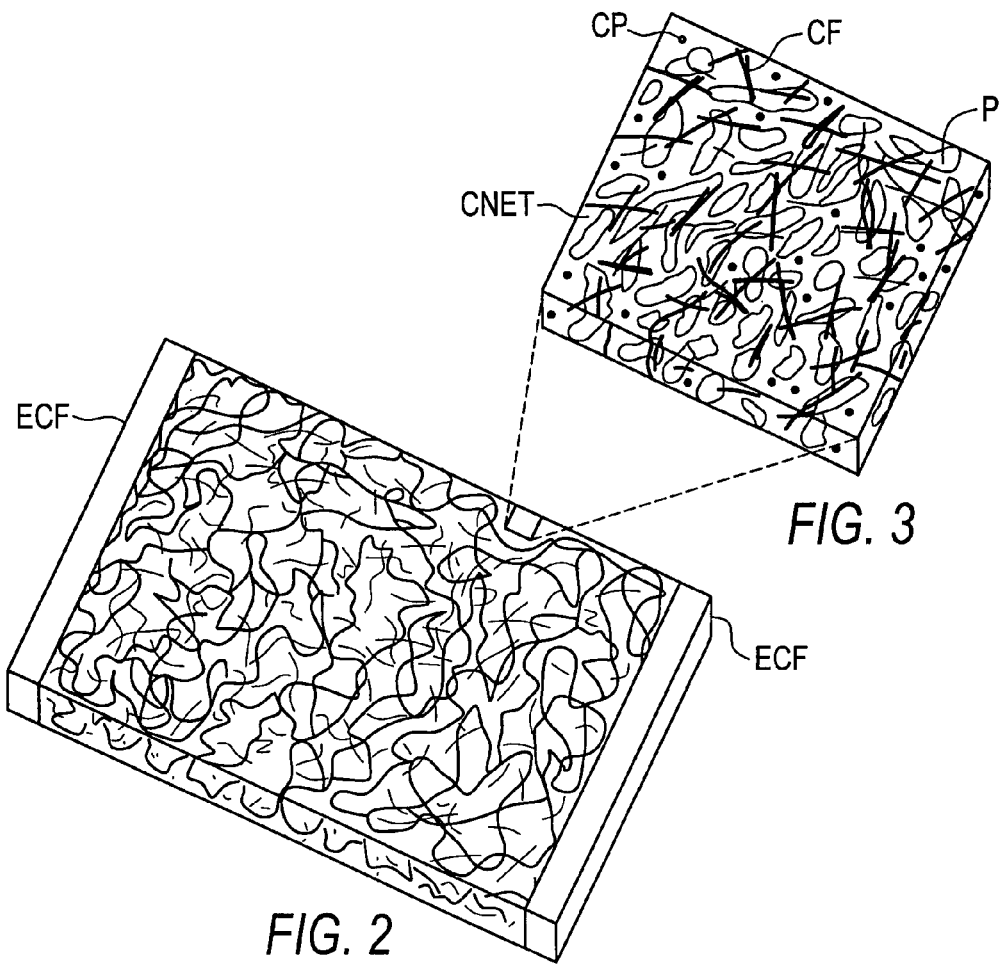
FIG. 3
FIG. 2

FIBROUS COMPOSITE CATALYTIC STRUCTURES AND THEIR USE IN CHEMICAL REACTORS

FIELD OF THE INVENTION

The present invention relates to permeable composite fibrous catalytic sheets comprised of at least three distinct solid phases. A first solid phase is an electrically conductive phase comprised of randomly oriented electrically conductive carbon fibers. A second solid phase is a 3-dimensional porous network of a non-conductive porous ceramic material. A third phase is comprised of catalytic particles dispersed on said 3-dimensional porous network.

BACKGROUND OF THE INVENTION

Hydrogen is used in the manufacture of many products including edible fats and oils, metals, semiconductors and microelectronics. Purified hydrogen is also an important fuel source for various energy conversion devices. For example, many types of fuel cells use purified hydrogen and an oxidant to produce electrical energy.

Various processes and equipment are used to produce hydrogen that is consumed by fuel cells. One such piece of equipment is a steam reformer, which reacts water and a hydrocarbonaceous material, such as an alcohol feed in the presence of a steam reforming catalyst to produce a reformate comprised predominantly of hydrogen. Examples of preferred steam reforming feeds include the $C_1$ to $C_3$ alkanes and $C_1$ to $C_3$ aliphatic alcohols.

Methanol is one of the more preferred feedstocks for use in steam reformers, or hydrogen generators, because methanol is easier to reform into a hydrogen enriched gas at relatively low temperatures compared to other hydrocarbonaceous feeds. Methanol reforming results in a lower concentration of gaseous by-products (carbon dioxide and carbon monoxide) compared to that produced from other hydrocarbonaceous feeds such as natural gas, ethanol, naphthas, and butane. This is particularly important for small portable reforming units where the temperature of the reformer unit is a concern. The reforming, or conversion of methanol into a predominantly hydrogen enriched gas, is typically accomplished using one of three different types of reforming processes. These three types are steam reforming, partial oxidation reforming, and autothermal reforming. Of these types, steam reforming is preferred because it is the easiest to control, it yields the least amount of undesirable gaseous by-products and it produces higher yields of hydrogen at lower temperatures.

During steam reforming, methanol is catalytically converted, in the presence of water and with the application of heat, to a hydrogen enriched gas. During partial oxidation reforming, methanol is converted to a hydrogen enriched gas through the partial oxidation of methanol over a catalyst and a limited supply of oxygen, or air, to prevent complete oxidation. Since this is an exothermic reaction, it does not require heat input to proceed. The reaction will proceed without any additional heat input provided the methanol and oxygen are in contact with the proper catalyst. Control of oxygen partial pressure and temperature is very critical, and for portable methanol reforming, the higher operating temperature of the partial oxidation reformer is a considerable disadvantage. Autothermal reforming is a combination of catalytic partial oxidation and steam reforming. During autothermal methanol reforming, the partial oxidation reaction, which produces heat, is carefully managed to provide enough heat for the reforming reaction. In an autothermal reformer, the reactions between the input reactants, namely methanol, water and air (or $O_2$), are carefully balanced over the catalyst, to produce $CO_2$ and $H_2$ with minimum CO make. The partial oxidation step and reforming step may be done in the same, or in separate, compartments during autothermal reforming.

Although catalysts in powder form can be used in chemical process units, such a form is inconvenient to handle and thus catalyst particles are typically mixed with a suitable binder, such as alumina, and formed into shapes such as spheres, pellets and rods. While these shapes are easier to handle, the result in typically a decrease in catalyst activity and/or selectivity.

While various catalytic reforming processes exist for producing hydrogen from hydrocarbonaceous feeds, such as alcohol feeds, there remains a need in the art for improvements in all phases of the process, particularly with respect to catalyst utilization.

SUMMARY OF THE INVENTION

In accordance with the present invention, there is provided a substantially rigid permeable composite catalytic sheet-like structure comprised of three distinct solid phases wherein: i) a first solid phase is comprised of a 3-dimensional substantially continuous network of a non-conductive porous ceramic material; ii) a second solid phase is comprised of a plurality of electrically conductive carbon fibers integrated throughout the 3-dimensional substantially continuous network of non-conductive porous ceramic material; and iii) a third solid phase comprised of an effective amount of catalyst particles dispersed throughout the non-conductive porous ceramic material.

In a preferred embodiment, the carbon fibers are graphitic fibers and the ceramic material is selected from the group consisting of alumina, silica, silica-alumina, titania, zirconia and magnesia.

In another preferred embodiment the catalyst is a methanol reforming catalyst wherein at least one catalytic metal is copper.

In still another preferred embodiment of the present invention there is also present an effective amount of a fourth solid phase which is comprised of non-conductive ceramic fibers selected from the group consisting of alumina fibers, aluminosilica fibers and aluminoborosilicate fibers.

In another preferred embodiment the permeable composite catalytic sheet-like structure is in the form of a sheet, board, or block.

Also in accordance with the present invention there are provided processes for producing the catalytic sheets of the present invention.

BRIEF DESCRIPTION OF THE FIGURES

FIG. 1 hereof is a perspective view of a representation of a catalytic sheet of the present invention.

FIG. 2 hereof is a perspective view of the catalytic sheet of FIG. 1 hereof, but containing current feeders on opposing sides.

FIG. 3 hereof is an exploded view of a section of the interior of a catalytic sheet of the present invention showing in more detail the relationship of all three phases to each other. The random array of electrically conductive carbon fibers is dense enough to enable an electric current to flow throughout the catalytic sheet.

Figure 4:
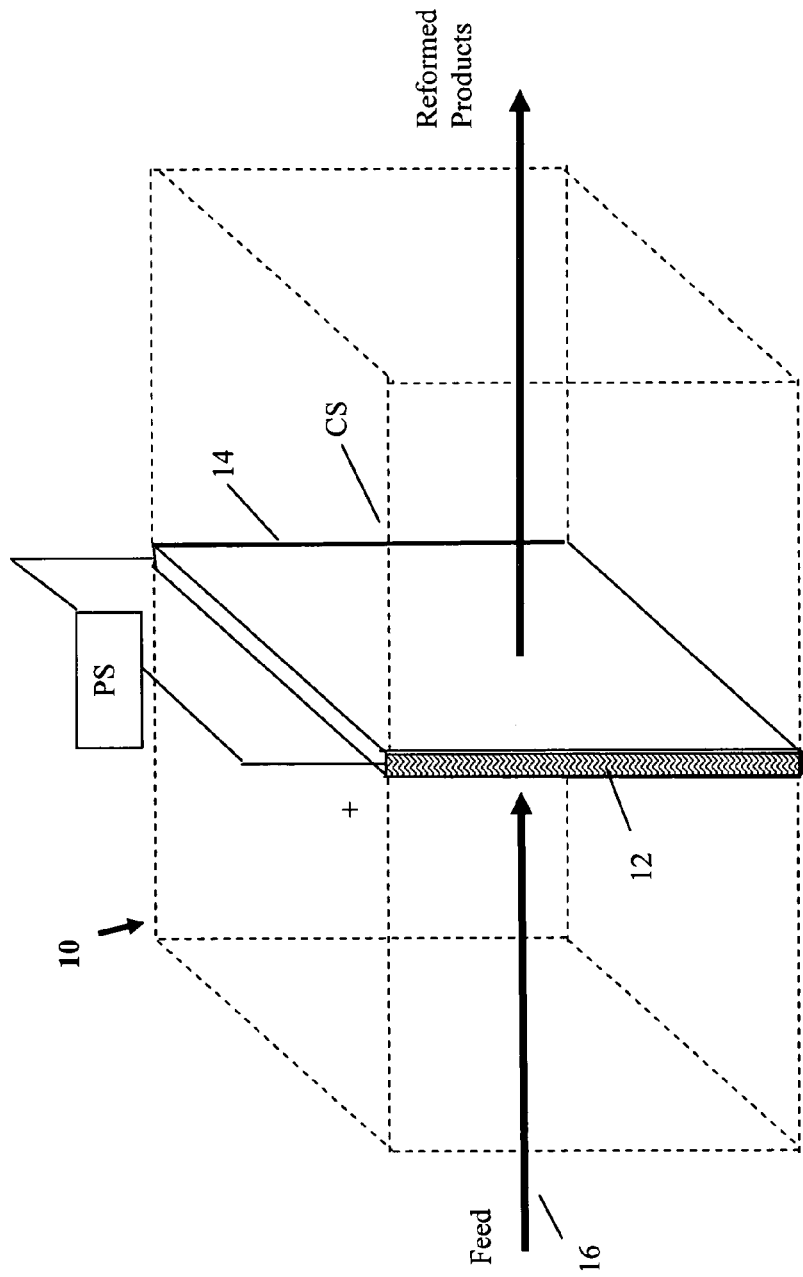
FIG. 4 is a representation of catalyst structure which is subjected to an electrical current and through which a hydrocarbonaceous feedstream, preferably a low carbon number alcohol feedstream is passed.

Example 8 hereof is a plot of percent methanol conversion versus methanol flow rate for the data obtained by Example 2 and Examples B-D.

Example 9 hereof is a plot of percent methanol conversion versus methanol flow rate for the data obtained by Examples E-H.

Example 10 hereof is a plot of percent methanol conversion versus methanol flow rate for the data obtained by Examples I-L.

Example 11 hereof is a plot of percent methanol conversion versus methanol flow rate for the data obtained by Examples M-P.

DETAILED DESCRIPTION OF THE INVENTION

The present invention primarily relates to permeable catalytic sheets for use in chemical reactors. Reactants are passed through the sheet, which are brought to reaction temperature by use of an electric current. It is within the scope of this invention that additional heat from an external source can be used if needed to reach reaction temperature. The reactants come into contact with catalyst particles contained in the catalytic sheet, thereby initiating the intended chemical reaction and producing the desired product stream. The chemical reaction is enhanced by an electric field created by an electric current passing through the conductive carbon fibers of the permeable catalytic sheet. The permeable catalytic sheets of the present invention are comprised of at least three distinct solid phases. The first solid phase is an electrically non-conductive phase characterized as being a 3-dimensional porous network, or matrix, of at least one ceramic material. By "3-dimensional" we mean that this first solid phase can be thought of as a substantially continuous porous phase as opposed to the second solid phase which is comprised of a plurality of randomly oriented individual electrically conductive carbon fibers, which is thought of as two dimensional. Any suitable ceramic material can be used. Non-limiting examples of suitable ceramic materials include alumina, silica, silica-alumina, titanic, magnesia and the like. Preferred are alumina, silica, and silica-alumina with alumina being more preferred.

A second solid phase is an electrically conductive phase that is comprised of a plurality of randomly oriented electrically conductive carbon fibers interspersed throughout at least a portion of the non-conductive first solid phase. The surface area of this electrically conductive solid phase will be from about 6 $m^2/g$ to about 20 $m^2/g$, preferably from about 6 $m^2/g$ to about 16 $m^2/g$, and more preferably from about 8 $m^2/g$ to about 12 $m^2/g$. The bulk density of this electrically conductive solid phase will be an effective bulk density. That is, the bulk density will be enough to provide electrical conductivity substantially throughout the sheet while allowing the reactant feed a sufficient residence time on catalyst at process flow rates. The distribution of carbon fibers will be porous enough so that the pressure drop of a reactant gas passing through the finished catalytic sheet will be equal to or less than about 0.5 psig, preferably equal to or less than about 0.3 psig, and more preferably equal to or less than about 0.1 psig.

A third solid phase is comprised of an effective amount of catalyst particles capable of catalyzing the intended chemical reaction. The catalyst particles can be present in bulk form (not on a carrier) or on a suitable carrier, such as a metal oxide, preferably alumina. Non-limiting examples of chemical reactions for which the catalytic sheets of this invention can be used include oxidation of volatile organics and perfluorocarbons from semiconductor manufacturing, groundwater remediation, NOx abatement from burners, water-gas shift reactions, polymer production, hydrocracking reactions, hydrogen gas production from gaseous hydrocarbonaceous fuel materials such as the steam reforming process involving methanol or methane. For example, the configurations of the embodiments discussed above and illustrated in the figures hereof can effectively be used in hydrogen production, environmental remediation, petroleum refining, plastics manufacturing, organic chemical manufacturing, fuel cells, and specialty gas sensing devices, to name a few.

It will be understood that an effective amount of non-conductive ceramic fibers may also used as an additional, or fourth, solid phase in the case where the total conductivity of the product catalytic sheet needs to be reduced to a target conductivity. Any suitable non-conductive ceramic fiber can be used for this purpose. This ceramic fiber phase is distinguished from the 3-dimensional non-conductive ceramic phase. For example, the ceramic fibers of this additional solid phase can be thought of as a plurality of 2-dimensional fibers since they are not jointed to one another in a 3-dimensional network. Non-limiting examples of such ceramic fibers that can be used in the practice of the present invention include alumina fibers, aluminosilicate fibers, and aluminoborosilicate fiber. Preferred are aluminosilicate fibers.

It is within the scope of this invention that an effective amount of carbon nanostructures be used as another additional solid phase. The carbon nanostructures, preferably graphitic nanostructures, can be used as a catalyst carrier or they can be used to enhance the conductivity of the resulting catalytic sheets. Non-limiting examples of preferred carbon nanostructures are those selected from carbon nanotubes, carbon fibrils, and carbon nanofibers. Typically, the nanostructure will be substantially graphitic, and in the case of carbon nanofibers and nanotubes, the most preferred nanostructures, the distance between graphitic platelets will be about 0.335 nm. It is to be understood that the terms "carbon filaments", "carbon whiskers", "carbon nanofibers", and "carbon fibrils", are sometimes used interchangeably by those having ordinary skill in the art.

For purposes of the present invention, carbon fibrils, which themselves are sometimes referred to as carbon nanotubes, are of the type described in U.S. Pat. Nos. 4,663,230 and 5,165,909. Carbon fibrils are reported to be essentially cylindrical discrete structures characterized by a substantially constant diameter between about 3.5 nm and 70 nm, a length greater than about 5, preferably 100 times the diameter, an outer region of multiple essentially continuous layers of ordered carbon atoms having c-axis that are substantially perpendicular to the cylindrical axis of the fibril, and a distinct inner core region. Each of the layers and core are reported in the above patents to be disposed substantially concentrically about the cylindrical axis of the fibril. The carbon fibrils are catalytically grown by the thermal decomposition of a gaseous carbon-containing compound.

Carbon nanotubes, other than those that are sometimes also referred to as carbon fibrils and those that are the multifaceted type, will typically be of the fullerene type. Such structures are described in an article by M. S. Dresselhaus et. al. entitled Fullerenes, on pages 2087-2092 in Journal of Materials Research., Vol. 8, No. 8, August 1993, which article is incorporated herein by reference. Fullerenes are $C_n$ cage molecules built from a collection of hexagonal and pentagonal faces. The $C_{60}$ fullerenes are typically referred to as "buckminsterfullerenes" or simply "buckyballs". $C_{60}$-derived tubules can be defined, in simplest terms, by bisecting a $C_{60}$ molecule at the equator and joining the two resulting hemispheres with a cylindrical tube one monolayer thick and with the same diameter as $C_{60}$. Cylindrical carbon nanotubes can also be defined as substantially hollow structures comprised of substantially parallel graphite layers aligned at distances of about 0.335 nm to 0.67 nm from each other. It is to be understood that the graphite platelets of the preferred carbon nanofibers of the present invention may have various orientations. For example, they can be aligned parallel, perpendicular, or at an angle with respect to the longitudinal axis of the nanofiber. Further, the surface area of the carbon nanofibers can be increased by careful activation with a suitable etching agent, such as carbon dioxide, steam, or the use of a selected catalyst, such as an alkali or alkaline-earth metal.

In addition, the preferred carbon nanofibers and multifaceted carbon nanotubes of the present invention will have: (i) a nitrogen surface area from about 40 to 300 $m^2/g$; (ii) an electrical resistivity of 0.4 ohm·cm to 0.1 ohm·cm; (iii) a crystallinity from about 95% to 100%; and (iv) a spacing between adjacent graphite sheets of 0.335 nm to about 1.1 nm, preferably from about 0.335 nm to about 0.67 nm, and more preferably from about 0.335 to about 0.40 nm.

The more preferred carbon nanofibers of this invention are those having graphite platelets that are substantially perpendicular to the longitudinal axis of the nanofiber ("platelet" structure) and those wherein the graphite platelets are aligned substantially parallel to the longitudinal axis ("cylindrical" and "multifaceted" tubular). U.S. Pat. No. 6,537,515 to Catalytic Materials, LLC, which is incorporated herein by reference, teaches a method for producing a substantially crystalline graphite nanofiber comprised of graphite platelets that are aligned substantially perpendicular to the longitudinal axis of the nanofiber.

The most preferred carbon nanofibers having their graphite platelets aligned substantially parallel to the longitudinal axis are the non-cylindrical multifaceted tubular nanofibers. Such multi-faceted tubular nanofibers can be single or multi-walled, preferably multi-walled. By multi-walled we mean that the structure can be thought of a multi-faceted tube within a multi-faceted tube, etc. The multi-faceted tubular carbon nanostructures of the present invention are distinguished from the so-called "fibrils" or cylindrical carbon nanostructures. The multi-faceted tubular nanofibers of the present invention can also be thought of as having a structure that resembles a multi-faceted pencil or Alan key. That is, a cross section of the multifaceted nanotube would represent a polygon. A single wall of the multifaceted nanotubes of the present invention can also be thought of as being a single sheet folded in such a way to resemble a multifaceted tubular structure—the folds being the corners.

It will be understood that the carbon nanostructures used herein can be a separate ingredient added to the mixture of fibers or they can be grown from and be a part of, the electrically conductive carbon fibers, the 3-dimensional non-conductive network, and/or ceramic fibers. The carbon nanofibers of this invention can provide additional conductivity to the final catalytic fibrous structure and thus lower loadings of conductive fiber can be used for the same total conductivity of the fibrous substrate structure.

The present invention can be better understood with reference to the figures hereof. FIG. 1 is an illustration of a perspective view of a preferred catalytic sheet CS of the present invention in the shape of a rectangle having a thickness of about 1 to 30 millimeters. The sheet is comprised of a plurality of randomly oriented carbon fibers CF, a 3-dimensional porous network of electrically non-conductive ceramic material CNET and catalyst particles CP. FIG. 2 shows the catalytic sheet of FIG. 1 hereof except that the sheet now contains electrical current feeders ECF to which an electrical power source can be connected. FIG. 3 hereof is a magnified view of a section of the interior of a catalytic sheet of the invention. FIG. 3 shows the 3-dimensional porous network of ceramic material CNET throughout the sheet and randomly oriented conductive carbon fibers CF. Catalyst particles CP can be seen associated with the 3-dimensional porous network but not the carbon fibers. It will be understood that during the preparation of the catalytic sheet of the present invention small amounts of catalyst particles may become associated with the electrically conductive carbon fibers, but no so much as to adversely affect the intended chemical process.

When electrical power is fed to the current feeder ECF an electrical current is carried through the sheet via the electrically conductive carbon fibers CF. This results in the sheet being heated to reaction temperature because a substantial amount of the carbon fibers are in intimate contact with the 3-dimensional porous network containing the catalyst particles. While the electrically induced heat alone may be enough to catalyze the intended chemical reaction, the plurality of electrically conductive carbon fibers creates an electric field throughout the catalytic sheet, thus providing an unexpected and synergistic effect with regard to the activity of the catalyst. Thus, for a given catalyst activity, or level of reactant conversion, the process can be run at lower temperatures compared to the case when only heat is provided to initiate the chemical reaction and not heat plus an electric field. It will be understood that some chemical reactions may require more heat than is generated by the electric current passing through the conductive carbon fibers. In such cases, additional heat from a conventional source, such as a burner, will be required.

The catalytic sheets of the present invention can be prepared by any suitable method. One preferred method is to prepare the catalytic sheets by a so-call "filtration" method wherein a suspension of catalyst particles is passed an effective amount of time through an electrically conductive carbon fiber mat (one of the solid phases) comprised of a plurality of electrically conductive carbon fibers. The carbon fiber mat will be comprised of a plurality of randomly oriented electrically conductive carbon fibers, preferably graphitic fibers. The surface area of this carbon fiber mat will preferably be from about 6 $m^2/g$ to about 20 $m^2/g$, more preferably from about 6 $m^2/g$ to about 16 $m^2/g$, and most preferably from about 8 $m^2/g$ to about 12 $m^2/g$. The bulk density of this electrically conductive solid phase will be an effective bulk density. That is, the bulk density will be enough to provide continuous electrical conductivity from one end of a sheet containing these carbon fibers to an opposing end. It will also allow the reactant feed to pass there-through at sufficient residence time on-catalyst at process flow rates. Further, it will be porous enough so that the pressure drop of a reactant gas (feed) passing through the catalytic sheet will be equal to or less than about 0.5 psig, preferably equal to or less than about 0.3 psig, and more preferably equal to or less than about 0.1 psig. The porosity of the catalytic sheets will preferably be form about 50 to about 99%, more preferably from about 80 to about 99%. Although this electrically conductive mat can be prepared by molding or pressing a suitable amount of electrically conductive carbon fibers, it is preferred that a pre-manufactured carbon fiber mat be obtained from a third party, such as Osaka Gas Co., Ltd.

A suspension containing an effective amount of catalyst particles is prepared by use of any suitable liquid dispersing agent. Preferred liquid dispersing agents include water, lower carbon number aliphatic alcohols, as well as any other organic solvents suitable for dispersing the catalyst particles and not cause any significant undesirable effect. More preferred are water, ethanol, and iso-propanol. By "effective amount of catalyst particles" we mean that amount needed in the suspension to result in the desired catalyst loading on the carbon fibers of the mat after a suitable number of times the suspension is passed through the carbon fiber mat. For example, only about 75 wt. % to about 90 wt. % of the catalyst particles in suspension will be transferred to the carbon fibers during any given pass-through, since some of the catalyst particles will always remain with the liquid dispersing agent and not deposit on the carbon fibers. After the predetermined amount of catalyst particles are loaded onto the carbon fiber mat, the catalyst-containing carbon fiber mat is dried to drive off substantially all extraneous dispersing agent. The drying will preferably be done at a temperature from about 85° C. to about 95° C. at atmospheric pressure, although reduced pressures can also be used.

A 3-dimensional non-conductive porous network of ceramic material is formed within the dried catalyst-containing carbon fiber mat. This is preferably done by use of a ceramic sol, more preferably an alumina sol. The alumina sol can be prepared by any suitable means, such as by using boehmite gel powder and 0.5 μm α-alumina particles, such that about 80% of the oxide alumina results from the α-alumina particles and the remaining 20% from the boehmite. If desired, silica sol can be added to the alumina sol to produce a mullite sol. The catalyst-containing carbon fiber mat is soaked in the ceramic sol for an effective amount of time and at about room temperature and atmospheric pressures. That is, for at least that amount of time needed for the sol to infiltrate throughout the carbon fiber mat. During this stage of the procedure a substantial amount, preferably substantially all, of the catalyst particles will migrate from the electrically conductive carbon fibers of the carbon fiber mat to the ceramic sol. The catalytic sheet of the present invention is completed by removing the carbon fiber mat from the sol and drying it under conditions similar to that previously mentioned. The dried catalytic sheet is then calcined in an oxygen-containing atmosphere, preferably air, and at a temperature of about 100° C. to about 500° C., preferably at a temperature of about 250° C. to about 450° C. for an effective amount of time which will typically be from about 0.5 hours to about 24 hours. The dried catalytic sheet is then activated by heating it in a reducing environment, typically in the presence of a hydrogen-containing gas, at a temperature from about 150° C. to about 300° C.

If an effective amount of ceramic fiber is to be used to reduce the total conductivity of the final catalytic sheet, it can be added to the ceramic sol during the preparation of the ceramic sol. An effective amount of carbon nanostructures can also be added during the preparation of the ceramic sol.

Current feeders can now be added to the final catalytic sheet. In a most preferred embodiment, the catalytic sheet is rectangular and one current feed is attached to one side of the sheet and another current feeder to the opposing side. The current feeder can be composed of any suitable conductive metal. It can be attached to the sides of the sheet by merely clamping it onto the sheet. It can also be attached by use of a solder or conductive paste, or by dipping opposing sides of the sheet into a molten conductive metal, then removed and allowed to harden. The current feeder must be physically secure enough to withstand the reaction conditions of the reactor in which the catalytic sheet is to be used. It is within the scope of this invention that the current feeder be part of a holder into which the catalytic sheet is placed for insertion and placement into a catalytic reactor.

In another preferred embodiment of the present invention, the catalytic sheets are prepared by blending together effective amounts of electrically conductive carbon fibers and catalyst particles. An effective amount of dispersing liquid is added and the resulting slurry is agitated, preferably by mechanical mixing, until a substantial homogeneous blend results. The blend is then passed through a filter of suitable composition and porosity to obtain a substantially uniform and substantially dry blend of ingredients. The blend in then placed in a vessel of suitable size to which a ceramic sol, as previously described, is added. The blend, plus ceramic sol, is placed in a mold of suitable size and predetermined shape and thickness and dried, as also previously described, to produce a shaped pre-catalytic sheet or mat of predetermined thickness. The pre-catalytic sheet is then calcined as previously described and reduced under reducing conditions and in the presence of a hydrogen-containing gas to produce the catalytic sheet.

FIG. 4 hereof is a simplified schematic of a catalytic sheet of the present invention used in a methanol reformer. Catalytic sheet CS is shown in methanol steam reformer reactor 10. The catalytic sheet is connected to an electric power source (PS) by current feeders 12 and 14. The amount of electrical power supplied will be an effective amount. That is, that amount needed to provide and maintain the reaction temperature plus to provide an electrical field throughout the sheet. A stream comprised of methanol and steam is introduced via line 16 into the inlet of the methanol reactor and passes through the catalytic sheet CS and reacts with the catalyst particles to produce a hydrogen-rich synthesis gas product. The inventor hereof believes that the electric field created by an electric current passing through the carbon fibers of the sheet results in a synergistic effect in combination with the heat of reaction which also provided by the electric current passing through the catalytic sheet. This results in a more active catalyst at any given temperature within the temperature range of the intended reaction. More active catalysts enable the intended process to be conducted at lower temperatures without sacrificing yield or selectivity.

Figure 5:
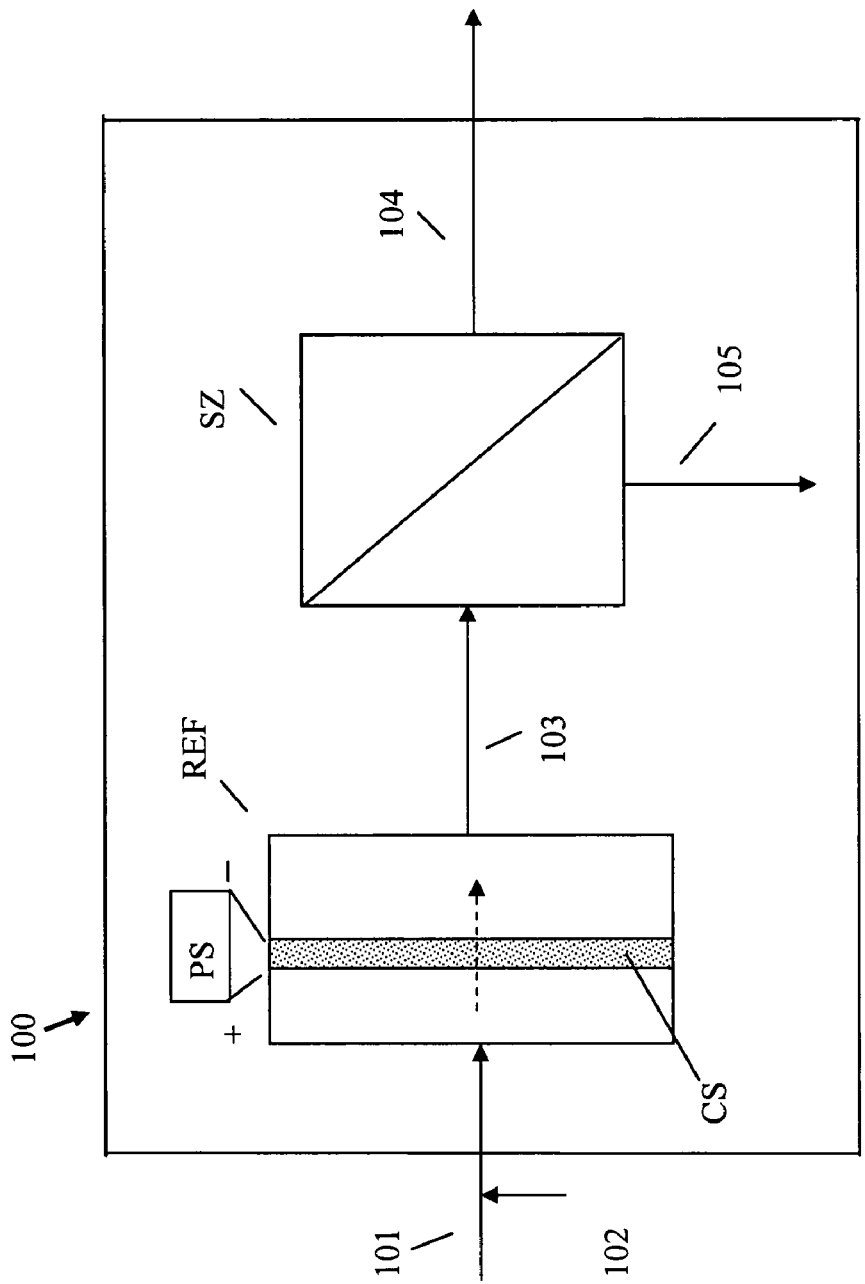
FIG. 5 hereof is representation of a methanol steam reforming process for producing a reformate gas that is passed to a separation zone to increase its' hydrogen concentration.

FIG. 5 hereof is a simplified schematic of a fuel processing system that contains a fuel processor for producing a product gas stream comprised predominantly of hydrogen. A preferred fuel processor is a steam reformer, which produces the product hydrogen-containing stream by steam reforming a feed stream containing water and a hydrocarbonaceous material. FIG. 5 shows a steam reforming process system generally indicated at 100 and comprised of a steam reformer REF and a gas separation zone SZ. A suitable feed, preferably methanol, is introduced into steam reformer REF via line 101 along with steam via line 102 where it passes through catalytic sheet CS. For example, if the intended reaction is methanol steam reforming (MSR), then it is preferred that the catalyst be a Cu/ZnO on alumina catalyst. Although this figure only shows one catalytic sheet it is to be understood that multiple catalytic sheets can be used in series either layered together or with a gap, or void, between one or more sheets. It is preferred that 2 catalytic sheets of the present invention be used in series with an effective void, or gap between each sheet. A suitable gap between sheets will be about ¼ to about 2 times the thickness of the catalytic sheets. Power supply PS supplies current to the catalytic sheet while feed is passing there through. Steam reformer REF is maintained at suitable temperatures, for example between about 200° C. and 800° C. and at pressures from about 0 psig to about 1000 psig. In some embodiments, feedstream 101 can be delivered to the steam reformer at an elevated temperature, and accordingly can provide at least a portion of the required heat needed for the intended reaction. When a burner or other combustion chamber is used to supply heat, a fuel stream is consumed and a heated exhaust stream is produced. Further, the feedstream is preferably vaporized prior to passing through the catalytic sheet and undergoing the reforming reaction.

While methanol is the feed of choice for producing hydrogen for purposes of this invention other hydrocarbonaceous feedstreams can also be used. Methanol steam reforming (MSR) typically takes place at a lower temperature compared to reforming other hydrocarbonaceous feedstreams. For example, methanol steam reformers typically have reforming regions that are heated to approximately 300° C. to about 500° C., preferably from about 350° C. to about 425° C. Methanol steam reformers also typically receive a feedstream having approximately a 1:1 molar ratio of methanol to water (or approximately 64% methanol by weight). This feed ratio may be varied without departing from the scope of the present invention and still produce sufficient amounts of hydrogen gas. Non-limiting examples of other hydrocarbonaceous feedstreams suitable for being treated in accordance with the present invention include the $C_1$ to $C_{11}$ alkanes, $C_1$ to $C_{20}$ alkanols, and petroleum streams such as diesel, kerosene, and naphthas. Petroleum streams may require hydrotreating to remove undesirable heteroatoms, such as sulfur and nitrogen. Preferred hydrocarbonaceous streams are the $C_1$ to $C_3$ alkanes, preferably methane or natural gas. When a naphtha is the hydrocarbon feed, the stream reformer is an on-board reactor for transportation vehicles that produces high purity hydrogen for an on-board fuel cell. Non-limiting examples of suitable $C_1$ to $C_{20}$ alkanols include the $C_1$ to $C_3$ aliphatic alcohols, as well as polyols, such as ethylene glycol and propylene glycol.

Traditionally, low temperature shift catalysts (LTS) have been used as methanol steam reforming catalysts. These catalysts were designed to catalytically facilitate the conversion of water and carbon monoxide to hydrogen and carbon dioxide at temperatures less than about 275° C., such as in the range of about 200-275° C. These catalysts typically are copper-based, such as stabilized compositions of copper and zinc. More particularly, LTS catalysts typically include copper oxide and zinc oxide supported on alumina. LTS catalysts are available in various shapes and forms, such as pellets, powders, etc. LTS catalysts containing copper and zinc will generally include approximately 10-90% copper (I) and/or copper (II) oxide and approximately 10-90% zinc oxide. As used herein, "copper oxide" shall mean copper (I) and/or copper (II) oxide. The LTS catalysts may further include other materials, such as 0-50% alumina. Other examples of LTS catalysts may be described as containing 20-60% copper oxide, 20-50% copper oxide, or 20-40% copper oxide. Still others include these illustrative ranges of copper oxide and 20-60% zinc oxide, 20-50% zinc oxide or 30-60% zinc oxide. Other LTS catalysts contain chromium instead of the copper-zinc formulations described above. An example of a conventional LTS catalyst is made by ICI Chemicals & Polymers, Ltd. of Billingham, England and sold under the trade name 52-1. This LTS catalyst contains approximately 30% copper (II) oxide, approximately 45% zinc oxide and approximately 13% alumina. Another example of a LTS catalyst is K3-110, which is made and sold by BASF Corporation. Other examples include G66B and T-2617, which are made and sold by Sud-Chemie, Inc., of Louisville, Ky. Unless otherwise specified herein, all composition percentages are expressed in wt %.

Catalysts used in the practice of the present invention are typically those containing Cu or a Group VIIII metal, such as Ni, Rh, Pd or Pt. These metals are preferably supported on a metal oxide support such as alumina, silica, silica-alumina, zirconia or magnesia. Another type of preferred methanol steam reforming catalyst that can be used in the practice of the present invention contains zinc oxide as an active component and does not contain copper oxide as an active component. By "active," it is meant that the component takes part in, or otherwise promotes, the methanol steam reforming reaction and the component is present in at least 3 wt % and often at least 5 or 10 wt % of the active components in the composition. Preferably, but not necessarily in all embodiments, the MSR catalyst contains zinc oxide and chromium oxide as active components. In such a catalyst, the chromium oxide enhances the activity of the zinc oxide. These MSR catalysts may contain at least about 20 wt. % zinc oxide, preferably about 25 wt. % to about 80 wt. % zinc oxide. For example, the catalyst may contain about 30 wt. % to about 70 wt. % zinc oxide, preferably from abut 40 wt. % to about 60 wt. % zinc oxide, more preferably about 50 wt. % zinc oxide. Similarly, the MSR catalyst may contain at least about 20 wt. % chromium oxide, preferably about 25 wt. % to about 80 wt. % chromium oxide. For example, the catalysts may contain about 30 wt. % to about 70 wt. % chromium oxide, preferably from about 40 wt. % to about 60 wt. % chromium oxide, more preferably about 50% chromium oxide.

Other examples of a composition that may be used as a MSR catalyst according to the present disclosure and which exhibits both of the above-discussed properties is sold under the trade name KMA by Sud Chemie. KMA is designed to be used as a high temperature methanol synthesis catalyst. By "high temperature" it is meant a temperature greater than about 700° C. and typically in the range of about 700° to about 900° C. For example, in contrast to an LTS catalyst, KMA has very little activity in the conventional temperature ranges in which LTS catalysts are used, such as 200° C. to about 275° C.

Another example of a suitable MSR catalyst suitable for use herein is a catalyst that contains zinc oxide supported on calcium aluminate. Similar to KMA, this MSR catalyst is not pyrophoric and is not reduced and deactivated by sintering during use. For example, the catalyst may contain up to approximately 95% zinc oxide and at least approximately 3% calcium aluminate. Other illustrative examples of possible compositions include about 25 to about 80 wt. % zinc oxide, about 50 to about 90 wt. % zinc oxide, and about 70 to about 95 wt. % zinc oxide. Similarly, the MSR catalyst may contain at least about 5 wt. % calcium aluminate, about 10 to about 30 wt. % calcium aluminate, about 25 to abut 75 wt. % calcium aluminate or about 40 to about 60 wt. % calcium aluminate. An example of such a catalyst is sold under the trade name G72-E from Sud Chemie. G72-E is designed to be used as a sulfur absorbent material but has proven effective as a MSR catalyst.

Although the above-described MSR catalysts are usually substantially free of copper oxide, it is within the scope of this invention that copper oxide may be present in small quantities, such as less than about 5 wt. % and preferably less than about 1 wt. %. Other examples of MSR catalysts that may offer some performance benefits over the copper-zinc LTS catalysts discussed above (especially when operated at a temperature at or above 300° C.) include high temperature shift catalysts that contain iron oxide. Again, these catalysts are designed for high temperature and/or pressure operation to produce methanol. However, and as discussed herein, the present disclosure is directed to using these catalysts at a moderate (300° to about 500° C.) temperature to produce hydrogen from methanol via steam reforming. Iron oxide is somewhat pyrophoric, but much less so than the copper-zinc LTS catalysts discussed above. Therefore, compared to copper-zinc LTS catalysts, these catalysts offer greater safety and reduced risk of fire when exposed to air. Similar to copper-zinc LTS catalysts, however, these iron oxide-based catalysts may be reduced and deactivated through sintering during use.

A further property that may be exhibited by MSR catalysts according to the present disclosure, either alone or in combination with one or more of the above properties, is that the MSR catalyst minimizes the amount of methane produced during the methanol steam reforming process. It is preferred that substantially no methane be produced during methanol steam reforming. For example, many high temperature shift catalysts and methanol synthesis catalysts, such as iron-based catalysts, produce approximately 1 wt. % to about 5 wt. % methane during a methanol steam reforming reaction. This production of methane, while not detrimental to many applications for the product hydrogen-containing reformate gas stream, and which may be removed or reduced in concentration in a subsequent separation and/or purification step, still reduces the overall yield of hydrogen gas because some of the methanol is reacted to form methane instead of hydrogen gas. KMA and other zinc oxide MSR catalysts meeting the criteria described herein and which do not contain iron oxide as an active component do not tend to produce methane when used as a MSR catalyst in the operating conditions described herein for steam reformer REF.

Hydrogen will be the major, or primary, component of the resulting product gas stream 103. Although product gas stream 103 contains a substantial amount of hydrogen gas, preferably less than or equal to 75 vol. %, the stream may also be referred to as a mixed gas stream because it also contains gases other than hydrogen. Examples of such other gases include carbon dioxide, carbon monoxide, water, methane and/or unreacted methanol as well as other carbon-containing feedstock.

However, many applications require a hydrogen stream that has greater purity and/or a reduced concentration of one or more non-hydrogen components that is present in product gas stream 103. Therefore, steam reformer REF may have an optional separation zone SZ in which the hydrogen purity of the product gas stream is increased and/or the concentration of at least one non-hydrogen component is reduced. As shown in FIG. 5 hereof, separation zone SZ receives the product gas stream 103 and produces a hydrogen-rich stream 104 therefrom. Hydrogen-rich stream 104 will have a greater concentration (or purity) of hydrogen gas than product gas stream 103 and/or has a reduced concentration of at least one non-hydrogen component of the product gas stream.

Separation zone SZ can utilize any suitable separation technology and/or utilize any suitable mechanism, including a pressure-driven mechanism or separation process, to increase the purity of product gas stream 103 and/or remove selected components therefrom, such as to separate product gas stream 103 into hydrogen-rich stream 104 and by-product stream 105. Although only a single one of each of these streams has been schematically illustrated, it is within the scope of the present disclosure that separation zone SZ may produce more than one of each of these streams, which may thereafter be combined before or after leaving the separation region. Similarly, although schematically illustrated as streams in FIG. 5 hereof, it is within the scope of the present invention that the by-product stream be formed from a portion of product gas stream 103 that is split from the stream and stored or otherwise retained within the separation zone and thereafter removed, such as during servicing, replacement of the containment structure, etc. It is also within the scope of the present disclosure that steam reformer REF utilize more than one separation zone and/or utilize more than one type of technology and/or structure for increasing the concentration of hydrogen gas and/or reducing the concentration of selected non-hydrogen components relative to product gas stream 103.

An example of a suitable separation structure for separation zone SZ is one or more hydrogen-permeable and/or hydrogen-selective membranes. The membranes can be formed of any hydrogen-permeable material suitable for use in the operating environment and parameters in which separation zone SZ is operated. Non-limiting examples of suitable materials for membranes include palladium and palladium alloys, and especially thin films of such metals and metal alloys. Palladium alloys have proven particularly effective, especially palladium with 35 wt % to 45 wt % copper. A palladium-copper alloy that contains approximately 40 wt % copper has proven particularly effective, although other relative concentrations and components may be used within the scope of the disclosure.

Hydrogen-selective membranes are typically formed from a thin foil that is approximately 0.001 inches thick. It is within the scope of the present disclosure, however, that the membranes be formed from other hydrogen-permeable and/or hydrogen-selective materials, including metals and metal alloys other than those discussed above as well as non-metallic materials and compositions, and that the membranes may have thicknesses that are greater or less than discussed above. For example, the membrane may be made thinner, with commensurate increase in hydrogen flux. Examples of suitable mechanisms for reducing the thickness of the membranes include rolling, sputtering and etching. A suitable etching process is disclosed in U.S. Pat. No. 6,152,995, the complete disclosure of which is hereby incorporated by reference for all purposes. Non-limiting examples of various membranes, membrane configurations, and methods for preparing the same are disclosed in U.S. Pat. Nos. 6,562,111 and 6,537,352, 6,319,306, and 6,221,117, the complete disclosures of which are hereby incorporated by reference for all purposes.

Another example of a suitable gas separation process that can be used in separation zone SZ is swing absorption. Non-limiting examples of swing adsorption processes that can be used in the practice of the present invention includes conventional pressure swing adsorption, rapid cycle pressure swing adsorption, partial pressure swing adsorption, thermal swing adsorption, and rapid cycle thermal swing adsorption. Accordingly, separation zone SZ can include one or more swing adsorption systems. Pressure swing adsorption (PSA) processes are well known to those having ordinary skill in the art and in such systems gaseous impurities are removed from a stream containing hydrogen gas. PSA is based on the principle that certain gases, under the proper conditions of temperature and pressure, will be adsorbed onto an adsorbent material more strongly than other gases. Typically, it is the impurities that are adsorbed and thus removed from product gas stream 103. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent material. Impurity gases such as $NH_3$, $H_2S$, and $H_2O$ adsorb very strongly on the adsorbent material and are therefore removed from product gas stream 103 along with other impurities. If the adsorbent material is to be regenerated and these impurities are present in product gas stream 103, separation zone SZ preferably includes a suitable device (not shown) that is adapted to remove these impurities prior to delivery of product gas stream to the adsorbent material because it is more difficult to desorb these impurities.

Yet another example of a suitable process for separation zone SZ is a chemical process, in which one or more non-hydrogen components of the product gas stream are chemically reacted to form additional hydrogen gas and/or to form components that are more desirable than the components that are removed from the product gas stream. Illustrative examples of chemical separation processes include the use of at least one methanation catalyst bed to produce methane from carbon monoxide and suitable structure for performing the water-gas shift reaction to produce hydrogen gas from water and carbon monoxide present in the product gas stream.

For example, in the context of a steam reformer that is producing a fuel stream for a fuel cell stack containing a plurality of fuel cells, many fuel cells are subject to damage if exposed to certain components, such as carbon monoxide and/or carbon dioxide above certain threshold concentrations. For at least many conventional proton-exchange membrane (PEM) fuel cells, the concentration of carbon monoxide should be less than 10 ppm (parts per million). Preferably, the system limits the concentration of carbon monoxide to less than 5 ppm, and even more preferably, to less than 1 ppm. The concentration of carbon dioxide may be greater than that of carbon monoxide. For example, concentrations of less than 25 wt. % carbon dioxide may be acceptable. Preferably, the concentration is less than 10 wt. %, and even more preferably, less than 1 wt. %. Especially preferred concentrations are less than 50 ppm. The acceptable maximum concentrations presented herein are illustrative examples, and concentrations other than those presented herein may be used and are within the scope of the present disclosure. For example, particular users or manufacturers may require minimum or maximum concentration levels or ranges that are different than those identified herein. Similarly, when steam reformers according to the present disclosure are used with a fuel cell stack that is more tolerant of these impurities, then the product hydrogen stream may contain larger amounts of these gases. Similarly, when the steam reformers are used to produce product hydrogen streams that are used for applications other than as a fuel stream for a fuel cell stack, it may be desirable to remove other components from the product hydrogen stream and/or it may not be necessary to utilize a separation process.

As previously mentioned, steam reformer process system 100 can utilize more than one type of separation process and/or include or be associated with more than one type of separation structure. For example, when the hydrogen-rich product stream is intended for use in a PEM fuel cell stack or other device that will be damaged if the stream contains more than determined concentrations of carbon monoxide or carbon dioxide, it may be desirable to include a methanation catalyst in one of the separation zones. The methanation catalyst converts carbon monoxide and carbon dioxide into methane and water, both of which will not damage a PEM fuel cell stack. A polishing zone (not shown) may also be used downstream of the one or more separation zones SZ and may also include a steam reforming catalyst to convert any unreacted feedstock into hydrogen. Thus, it is optional to include a downstream, or secondary, reforming zone. In such an embodiment, it is preferable that the reforming catalyst is upstream from the methanation catalyst so as not to reintroduce carbon dioxide or carbon monoxide downstream of the methanation catalyst.

Figure 6:
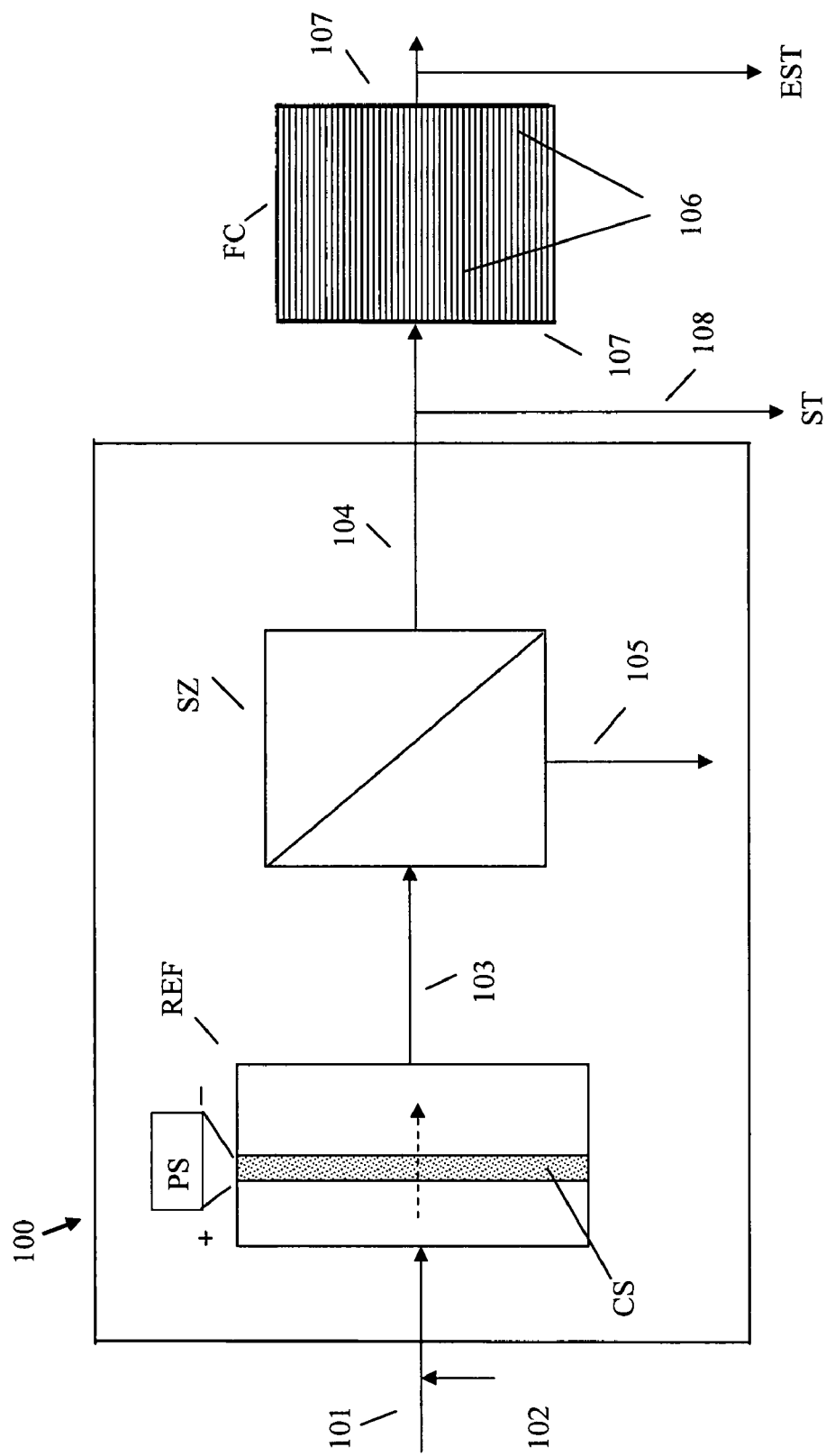
FIG. 6 hereof is a representation of a steam reforming process for producing a reformate gas that is treated to increase its hydrogen purity, which purified hydrogen stream is fed to a fuel cell.

As schematically illustrated in FIG. 6 hereof, steam reformer REF according to the present disclosure can be adapted to deliver at least a portion of a high purity hydrogen stream 104 to at least one fuel cell stack FC. Fuel cell stack FC receives the portion of the product hydrogen stream and an oxidant and produces an electric current therefrom. Non-limiting examples of suitable oxidants include air, oxygen gas, and oxygen-enriched air. The oxidant stream may be delivered to the fuel cell stack via any suitable mechanism. Although the steam reforming process system is indicated at 100 in FIG. 6, it is within the scope of the present invention that any of the steam reformers previously disclosed herein may be incorporated with a fuel cell system. Fuel cell stack FC is adapted to produce an electric current from that portion of product hydrogen stream 104 delivered thereto. In the illustrated embodiment, a single steam reformer system 100 and a single fuel cell stack FC are shown and described. However, more than one of either, or both of these components, may be used. It is also within the scope of the present invention that these components have been schematically illustrated and that the fuel cell system may include additional components that are not specifically illustrated in FIG. 6, such as feed pumps, air delivery systems, heat exchangers, controllers, flow-regulating structures, sensor assemblies, heating assemblies, power management modules, and the like.

A fuel cell stack typically includes multiple fuel cells 106 joined together between common end plates 107, that contain fluid delivery/removal conduits (not shown). Examples of suitable fuel cells include proton exchange membrane (PEM) fuel cells and alkaline fuel cells. Fuel cell stack FC can receive all of product hydrogen stream 104. Some or all of hydrogen stream 104 may additionally, or alternatively, be delivered, via a suitable conduit, for use in another hydrogen-consuming process, burned for fuel or heat, or stored for later use. For example, and as illustrated in FIG. 6 hereof, it is within the scope of the disclosure that at least a portion of the product hydrogen stream produced by the steam reformer be conducted via line 108 in a suitable hydrogen storage device ST. Non-limiting examples of suitable storage devices for hydrogen gas include pressurized tanks and hydride beds. When the fuel cell system includes a steam reformer and a hydrogen storage device ST, the hydrogen gas that is delivered to fuel cell stack FC may come from reformer REF, storage device ST, or both. A portion of the hydrogen can even come from an external source as well. Fuel processing and fuel cell systems according to the present disclosure may also be constructed without a hydrogen storage device.

The electric current produced by fuel cell stack FC may be used to satisfy the energy demands, or applied load, of at least one associated energy-consuming device (not shown). Non-limiting examples of such energy-consuming devices include motor vehicles, recreational vehicles, industrial or construction vehicles, boat or other seacraft, tools, lights or lighting assemblies, appliances (such as a household or other appliance), households, commercial offices or buildings, neighborhoods, industrial equipment, signaling or communication equipment, the balance-of-plant electrical requirements for the fuel cell system, etc. It is within the scope of the present invention that the fuel cell system may (but is not required to) include at least one energy-storage device EST which is adapted to store at least a portion of the current produced by fuel cell stack FC. Described in other words, the current may establish a potential that may be later used to satisfy an applied load, such as from an energy-consuming device. An illustrative example of a suitable energy-storage devices is a battery, but others may be used, such as ultra capacitors and flywheels. Energy storage device EST may additionally or alternatively be used to power the fuel cell system, such as during startup of the system.

The following examples are presented for illustrative purposes only and are not to be taken as being limiting in any way.

EXAMPLE 1 AND COMPARATIVE EXAMPLE A

Preparation of Catalytic Sheet

The following procedure, which is sometimes referred to herein as the "filtration procedure", was used to prepare a plurality of catalytic sheets for these two examples.

A suspension was prepared by mixing 40 g of a commercial CuO/ZnO catalyst in 1000 ml iso-propanol at room temperature, and treated with ultrasonic at about room temperature (18° C. to 21° C.) for 2 hours. The commercial CuO/ZnO catalyst used was in powder form having a density of 65-85 lb/ft and with particles sizes ranging from about 300 μm to about 1 mm and available from Süd-Chemie Inc. with the designation C18-AMT. A 9 cm diameter carbon fiber felt having a thickness of 10 mm and weighing 3.5 g was placed on a Buchner funnel and placed on a filtering flask. The carbon fiber felt mat was pretreated by oxidizing it with $H_2O_2$. The carbon fiber mat acts as a filter. The carbon fiber mat, which is available from Osaka Gas Chemicals Co. Ltd was comprised of electrically conductive carbon fibers having an average fiber diameter of about 10 μm and average unit weight of about 500 g/m. The CuO/Zn catalyst in iso-propanol suspension was poured through the carbon fiber mat until the suspension was substantially depleted of catalyst, thus indicating that substantially all of the catalyst was taken up by the carbon fiber mat. The so treated carbon fiber mat was then dried at a temperature of about 100° C. for about 5 hrs. It was found that about 34 g. of CuO/ZnO catalyst was loaded onto the carbon fiber mat.

The dried mat, which had sponge-like appearance, was then soaked in 100 g of alumina sol designated Al20 from Nyacol Nano Technologies, Inc. which was comprised of 20 wt. % alumina in deionized water. The alumina particle size was about 50 nm. After soaking in the alumina sol the treated carbon fiber mat was dried and calcined at about 350° C. for about 10 hours. The result was a 61 g catalytic sheet characterized as having three distinct solid phases. A first solid phase was comprised of a 3-dimensional network of porous/fibrous alumina (from the sol) that was interspersed throughout the carbon fiber mat, which carbon fiber mat represents a second solid phase. It was observed that substantially all of the catalyst particles (third solid phase) had migrated from the carbon fiber mat to the 3-dimensional alumina network.

Use of Catalytic Sheet in Methanol Reforming

For each run for each example a section of the catalytic sheet measuring 1.25×1.25×0.3 inch³ was cut to fit into the methanol reforming apparatus used in these examples. This section of catalytic sheet had an overall weight of about 7.0 g; contained 3.9 g. of catalyst, 0.55 g. of carbon fibers, 2.55 g of 3-dimensional alumina network and a resistance of 7 ohms. The section of catalytic sheet was positioned in a methanol steam reforming reactor so that a methanol feedstream could pass through the sheet perpendicular to the face of the sheet. The temperature at which the methanol steam reforming was performed for Example 1 was 150° C. and was provided by use of an electric current that was passed through the catalytic sheet at a power (P) about 28 watts. The temperature at which the methanol steam reforming was conducted for Comparative Example A was 250° C. and was provided by use of an oven into which the reformer apparatus was placed. No electric current was passed through the catalytic sheet for Comparative Example A. Each example was performed without the use of an argon reference gas, each was run at various feed rates as shown in Table I below, and each at a steam to carbon ration of about 1.5 and a methanol/steam feed rate from about 0.05 to 0.2 ml/min. The product gas exiting the reactor was trapped by water at about 0° C. and the collected methanol/water mixture was analyzed by GC-FID (Gas Chromatography-Flame Ionization Detector). Table I below shows the results from these two Examples.

TABLE I

| MeOH (sccm) | Example 1 Conversion of MeOH (%) | Comparative Example A Conversion of MeOH (%) | GHSV (/hr) |
| --- | --- | --- | --- |
| 17 | 93 | 80 | 324 |
| 33 | 80 | 71 | 648 |
| 66 | 66 | 50 | 1296 |

Figure 7:
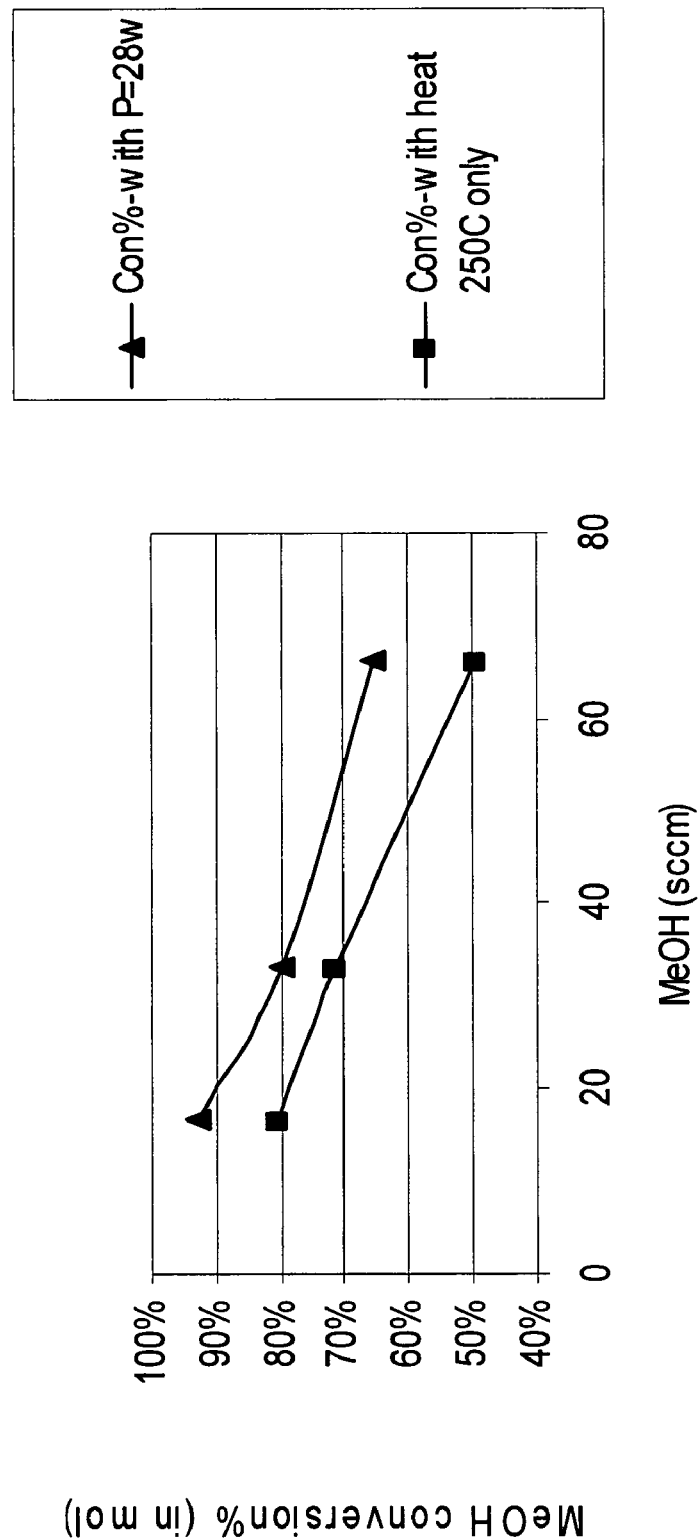
FIG. 7 hereof is a plot of percent methanol conversion versus methanol flow rate in standard cubic centimeters per minute (sccm) for the data obtained by Example 1 and Comparative Example A.

FIG. 7 hereof is a plot of the data of Table I which evidences that greater methanol conversion can be achieved at lower temperatures when the catalytic sheet of the present invention is heated by use of an electric current that is passed through the sheet was opposed to more conventional heating in an oven.

EXAMPLE 2 AND COMPARATIVE EXAMPLES B-D

The following procedure, which is sometimes referred to herein as the "mixing procedure" was used to prepare a plurality of catalytic sheets for these two examples.

20 g of the commercial CuO/ZnO catalyst used for the above examples were mixed with 4 g of chopped electrically conductive carbon fibers and 100 g of the alumina sol as used in above examples. The mixture was introduced into a 2 ft×2 ft×0.7 ft mold. The molded mixture was dried at about 95° C. for 10 hours then calcined at about 350° C. for 5 hours. 1.25×1.25×0.35 inch³ sections of the molded sheet were cut for testing in the methanol steam reforming apparatus of these examples. Each resulting catalytic sheet weighed 6.2 g and contained 3.9 g of catalyst and 2.3 gram of alumina. The electrical resistance of the sheet was 60 ohms. The catalytic sheets also contained three distinct solid phases. A first solid phase was comprised of a 3-dimensional network of porous/fibrous alumina (from the alumina sol), a second solid phase comprised of the carbon fibers interspersed throughout the 3-dimensional alumina network and catalyst particles (third solid phase) substantially all of which were found on the 3-dimensional alumina network and not the on the carbon fibers.

Use of Catalytic Sheet in Methanol Reforming

Methanol steam reforming was performed as in the above examples. The temperature for Example 2 was 150° C. which was provided by an electric current at 28 watt power being applied to the catalytic sheet. The temperatures for Comparative Examples B, C and D were provided by an oven at temperatures 250° C., 200° C. and 150° C. respectively. No electric current was passed through the catalytic sheets for the Comparative Examples B-D. The level of methanol conversion was measured for each and the results are set forth in Table II below.

TABLE II

| MeOH (sccm) | Example 1 Conversion of MeOH (%) | Comparative Example B Conversion of MeOH (%) | Comparative Example C Conversion of MeOH (%) | Comparative Example D Conversion of MeOH (%) | GHSV (/hr) |
|---|---|---|---|---|---|
| 17 | 93 | 87 | 83 | 38 | 324 |
| 33 | 91 | 72 | 61 | 36 | 648 |
| 66 | 82 | 66 | 51 | 31 | 1296 |

Figure 8:
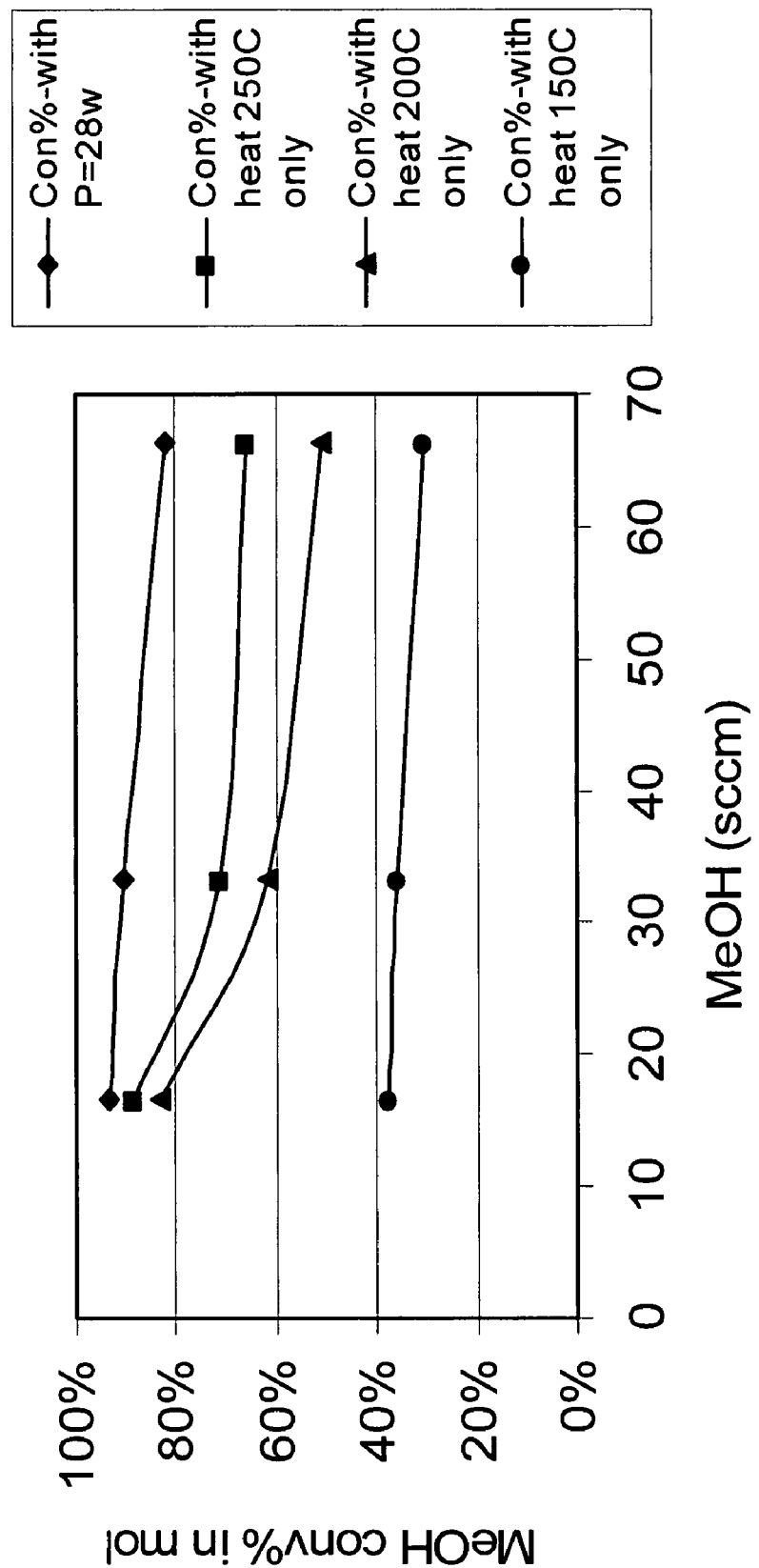

FIG. 8 hereof is a plot of the data of Table II which again evidences that greater methanol conversion can be achieved at lower temperatures when the catalytic sheet of the present invention is heated by use of an electric current that is passed through the sheet was opposed to more conventional heating in an oven.

COMPARATIVE EXAMPLES E-H

The filtration procedure of Example 1 and Comparative Example A was followed for preparing catalytic sheets except no alumina sol was used. Methanol steam reforming reactions were run with the resulting catalytic sheets, which now contained the catalyst particles on the carbon fiber mat instead of on a 3-dimensional non-conductive network. The temperature of Comparative Example E was 150° C. which was provided by an electric current at 28 watt power being applied to the catalytic sheet. The temperature for Comparative Examples F, G and H was provided by an oven at temperatures 250° C., 200° C. and 150° C. respectively. No electric current was passed through the catalytic sheet for Comparative Examples F-H. The level of methanol conversion was measured for each and the results are set forth in Table III below.

TABLE III

| MeOH (sccm) | Comparative Example E Conversion of MeOH (%) | Comparative Example F Conversion of MeOH (%) | Comparative Example G Conversion of MeOH (%) | Comparative Example H Conversion of MeOH (%) | GHSV (/hr) |
|---|---|---|---|---|---|
| 17 | 94 | 89 | 72 | 46 | 324 |
| 33 | 78 | 75 | 57 | 21 | 648 |
| 66 | 56 | 55 | 46 | 19 | 1296 |

Figure 9:
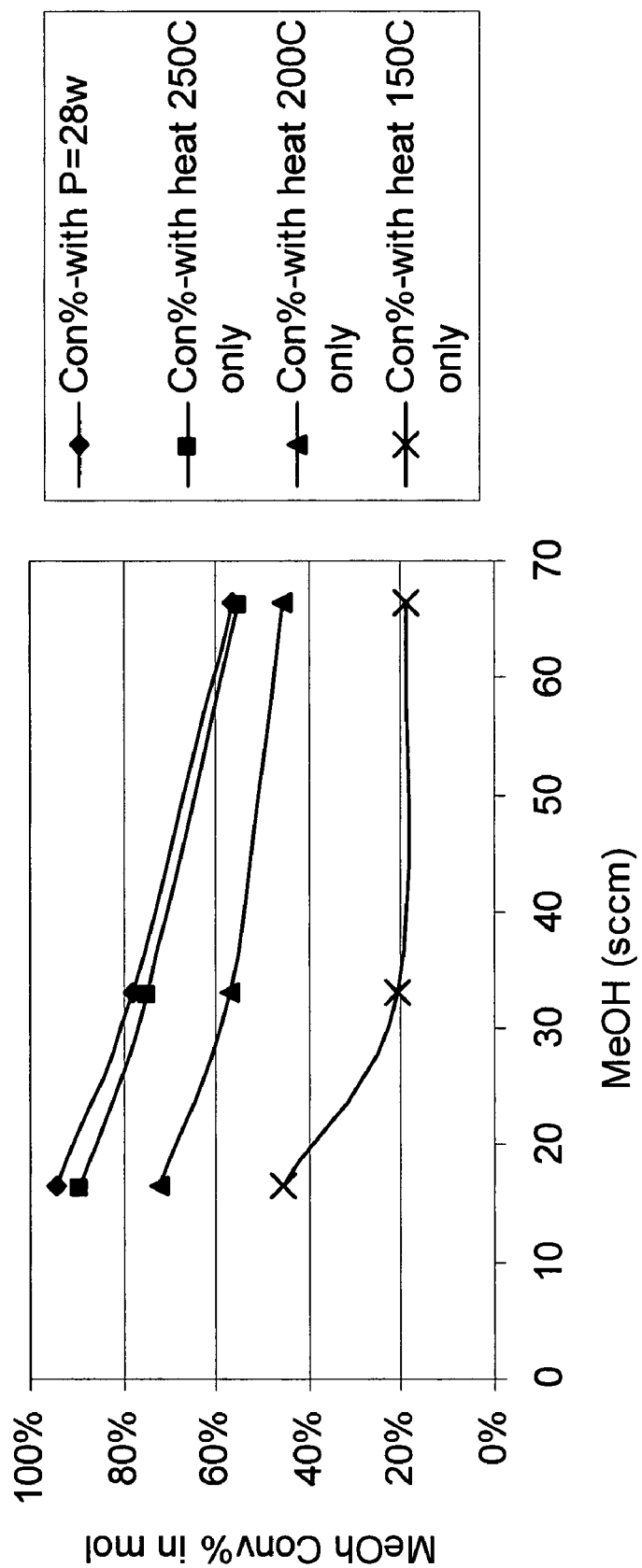

FIG. 9 hereof is a plot of the data of Table III which evidences that greater methanol conversion can be achieved at lower temperatures when the catalytic sheet of the present invention is heated by use of an electric current that is passed through the sheet was opposed to more conventional heating in an oven.

COMPARATIVE EXAMPLES I-L

The following procedure was used to prepare a plurality of catalytic sheets for these four comparative examples.

A $Cu^{2+}/Zn^{2+}$ solution was prepared by mixing 15 g Copper (II) nitrate.$2.5H_2O$ and 15 g Zinc(II) nitrate.$6H_2O$ with deionized water/ethanol=30/30 mL. To this solution there was added a 9 cm diameter carbon fiber felt. The carbon fiber felt mat was pretreated by oxidizing it with $H_2O_2$. The thickness of this felt was 10 mm and weighed 3.5 g. The so treated carbon fiber felt was dried at 100° C. for 30 min, then an aqueous solution of $NH_4OH$ (pH=12, prepared by $NH_4OH$ (30%) 20 mL and 20 mL ethanol) was introduced into the mixture. The metal salts were converted to $Cu(OH)_2$ and $Zn(OH)_2$, and these metal hydroxides were directly loaded onto carbon fiber felt. The metal hydroxide treated carbon felts was then dried at 100° C. for 4 hours. The resulting sheets were then calcined at 350° C. for 3 hours, and reduced with $H_2/Ar$ at 15/100 sccm, and at 250° C. for 2 hours to obtain a structure comprised of Cu/ZnO catalyst on the carbon fiber felt.

9.9 g of a CuO/ZnO commercial catalyst identified for Example 1 was loaded onto the carbon fiber felt. Sample sizes of the catalytic sheets measuring 1.25×1.25×0.3 $inch^3$ weighing 2.0 g were cut for placement in the methanol reforming apparatus of the present invention. These sheet samples contained 1.45 g of catalyst, 0.55 g of carbon fiber, after reduction, and had an electrical resistance of 50 Ohms.

The sample of catalytic sheets were used in methanol steam reforming in accordance with the procedure for the above examples except that the temperature for Comparative Example I was 150° C. which was provided by an electric current at 30 watt power being applied to the catalytic sheet. The temperature for Comparative Examples J, K, and L was provided by an oven at temperatures of 250° C., 200° C. and 150° C. respectively. No electric current was passed through the catalytic sheets for Comparative Examples J-L. The level of methanol conversion was measured for each and the results are set forth in Table IV below.

TABLE IV

| MeOH (sccm) | Example 1 Conversion of MeOH (%) | Comparative Example I Conversion of MeOH (%) | Comparative Example J Conversion of MeOH (%) | Comparative Example K Conversion of MeOH (%) | Comparative Example L Conversion of MeOH (%) | GHSV (/hr) |
|---|---|---|---|---|---|---|
| 17 | 93 | 72 | 66 | 48 | 35 | 324 |
| 33 | 80 | 63 | 57 | 46 | 24 | 648 |
| 66 | 66 | 46 | 48 | 35 | 20 | 1296 |

Figure 10:
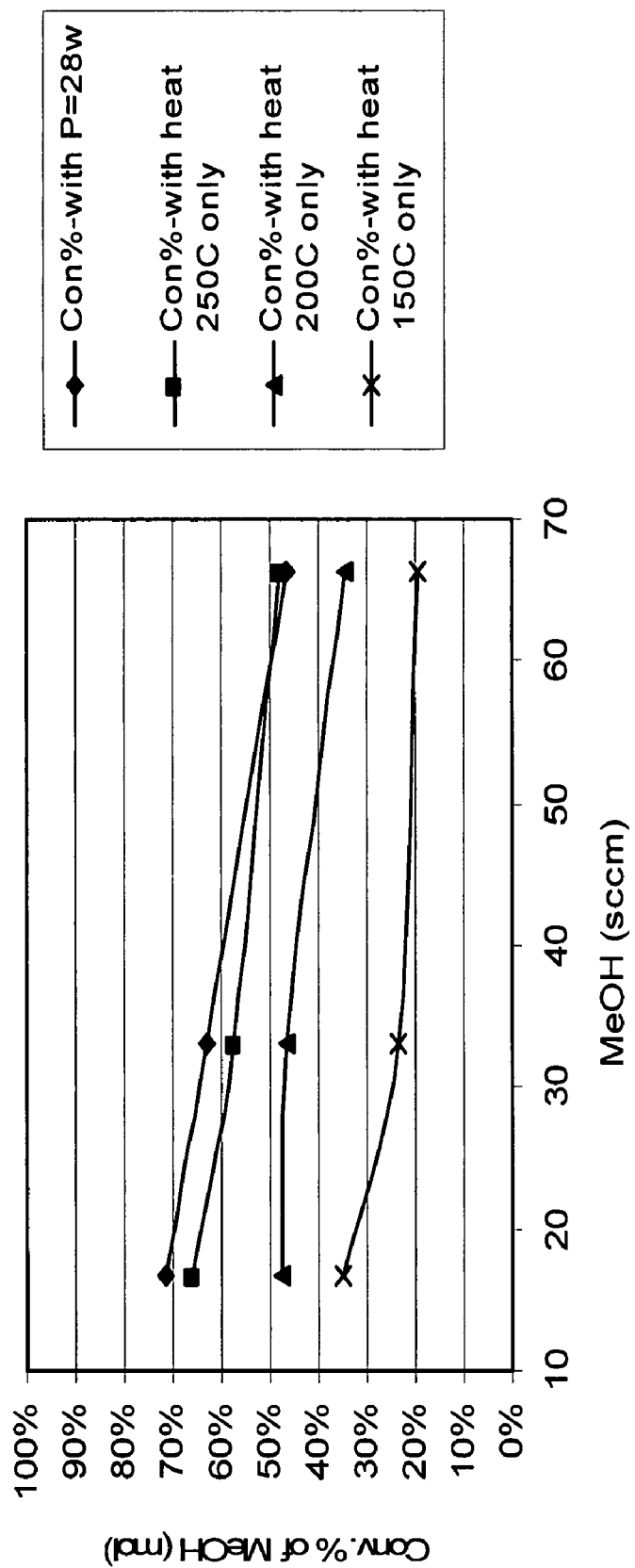

FIG. 10 hereof is a plot of the data of Table IV which evidences that the greatest level of methanol conversion is found when the catalyst particles are located on the non-conductive ceramic (alumina) network and not on the carbon fibers when an electric current is passed through the catalytic sheet.

COMPARATIVE EXAMPLES M-P

The following procedure was used to prepare a plurality of catalytic sheets for these four comparative examples.

A $Cu^{2+}/Zn^{2+}$ solution was prepared by mixing 15 g Copper (II) nitrate.2.5H2O and 15 g Zinc(II) nitrate.6H2O with deionized water/ethanol=30/30 mL. To this solution there was added a 9 cm diameter carbon fiber felt. The carbon fiber felt mat was pretreated by oxidizing it with $H_2O_2$. The thickness of this felt was 10 mm and weighed 3.5 g. The so treated carbon fiber felt was dried at 100° C. for 30 min, then an aqueous solution of $NH_4OH$ (pH=12, prepared by $NH_4OH$ (30%) 20 mL and 20 mL ethanol) was introduced into to the above mixture. The metal salts were converted to $Cu(OH)_2$ and $Zn(OH)_2$, and these metal hydroxides were directly loaded onto carbon fiber felt. The metal hydroxide treated carbon felts was then dried at 100° C. for 4 hours. The resulting sheets were then calcined at 350° C. for 3 hours, and reduced with $H_2/Ar$=15/100 sccm ratio, at 250° C. for 2 hours to obtained Cu/ZnO-Carbon fiber felt.

10.6 g of a CuO/ZnO commercial catalyst identified for Example 1 was loaded onto the carbon fiber felt. Sample sizes of the catalytic sheets measuring 1.25×1.25×0.3 $inch^3$ weighing 1.9 g were cut for placement in the methanol reforming apparatus of the present invention. These catalytic sheet samples contained 1.45 g of catalyst, 0.55 g of carbon fiber and was immobilized by use of the AL20 alumina sol, and dried at 90° C. for 3 hours. The weight of substrate was 3.2 g. After reduction the electrical resistance of the catalytic sheet samples was about 60 ohms The sample of catalytic sheets were used in methanol steam reforming in accordance with the procedure for the above examples except that the temperature for Comparative Example M was 150° C. which was provided by an electric current at 28 watt power being applied to the catalytic sheet. The temperatures for Comparative Examples N, O and P were provided by an oven at temperatures 250° C., 200° C. and 150° C. respectively. No electric current was passed through the catalytic sheets for Comparative Examples N-P. The level of methanol conversion was measured for each and the results are set forth in Table V below and FIG. 11 hereof.

TABLE V

| MeOH (sccm) | Example 1 Conversion of MeOH (%) | Comparative Example M Conversion of MeOH (%) | Comparative Example N Conversion of MeOH (%) | Comparative Example O Conversion of MeOH (%) | Comparative Example P Conversion of MeOH (%) | GHSV (/hr) |
|---|---|---|---|---|---|---|
| 17 | 93 | 78 | 51 | 50 | 45 | 324 |
| 33 | 80 | 73 | 48 | 46 | 44 | 648 |
| 66 | 66 | 48 | 44 | 42 | 43 | 1296 |

Figure 11:
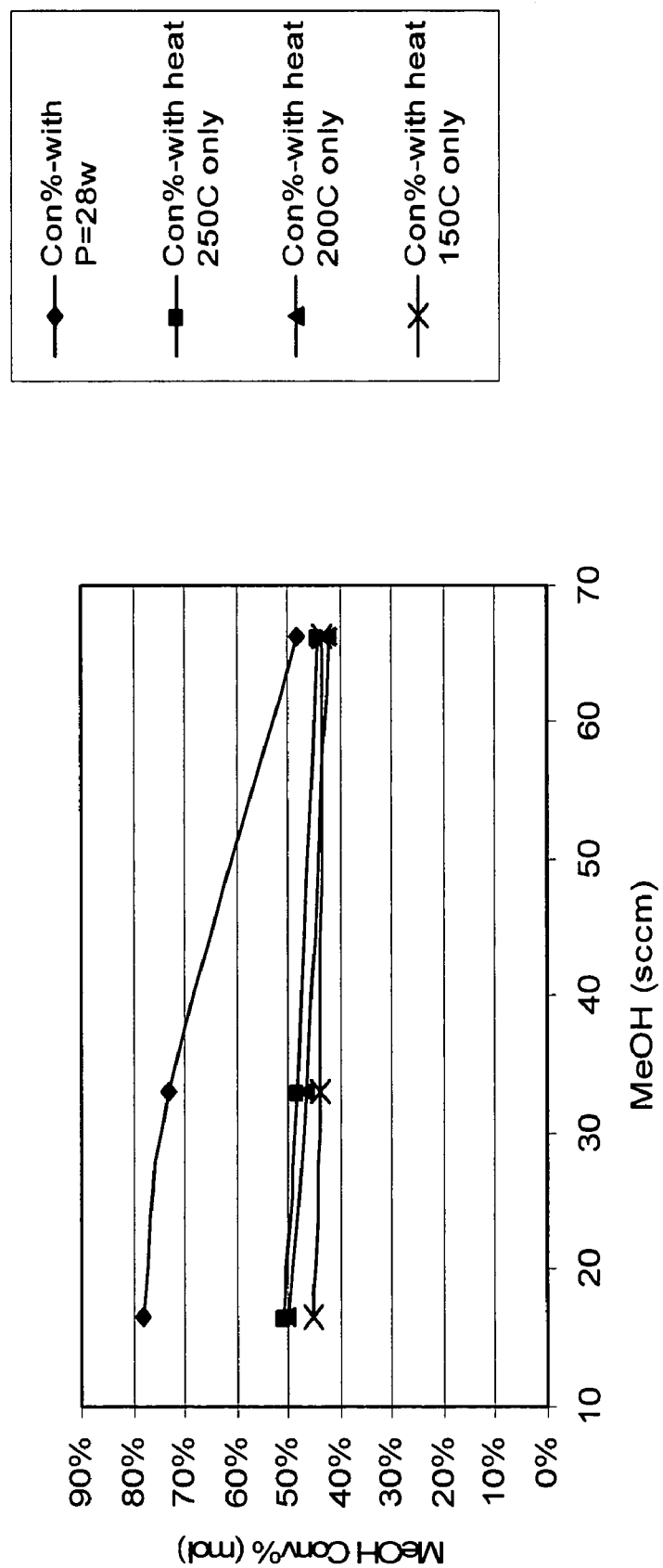

FIG. 11 hereof is a plot of the data of Table V which again evidences that the greatest level of methanol conversion is found when the catalyst particles are located on the non-conductive ceramic (alumina) network and not on the carbon fibers when an electric current is passed through the catalytic sheet.

What is claimed is:

1. A catalytic sheet comprised of four solid phases wherein a first solid phase is comprised of a plurality of randomly oriented electrically conductive graphitic carbon fibers, a second solid phase is comprised of a 3-dimensional network of a substantially non-conductive porous ceramic material intermingled with said first solid phase, a third solid phase comprised of a plurality of catalyst particles dispersed on said 3-dimensional network of porous ceramic material, and a fourth solid phase comprised of non-conductive ceramic fibers.

2. The catalytic sheet of claim 1 wherein the ceramic material is selected from the group consisting of alumina, silica, silica-alumina, titania, zirconia, and magnesia.

3. The catalytic sheet of claim 2 wherein the ceramic material is alumina.

4. The catalytic sheet of claim 1 wherein the catalyst is a methanol reforming catalyst.

5. The catalytic sheet of claim 4 wherein the methanol reforming catalyst contains copper.

6. The catalyst sheet of claim 4 wherein the methanol reforming catalyst contains both copper and zinc oxide.

7. The catalytic sheet of claim 1 wherein the ceramic fibers are selected from the group consisting of zirconia fibers, alumina fibers, aluminosilica fibers and aluminoborosilicate fibers.

8. The catalytic sheet of claim 1 wherein there is also present graphitic nanofibers.

9. The catalytic sheet of claim 8 wherein the graphitic nanofibers are comprised of graphite platelets that are aligned parallel, perpendicular or at an angle to the longitudinal axis of the nanofiber.

10. A catalytic sheet comprised of four solid phases wherein a first solid phase is comprised of a plurality of randomly oriented electrically conductive graphitic carbon fibers; a second solid phase which is comprised of a 3-dimensional network of an substantially non-conductive porous ceramic material intermingled with said first solid phase, which ceramic material is selected from the group consisting of alumina, silica, alumina-silica, titania, zirconia, and magnesia; a third solid phase which is comprised of a plurality of particles of methanol reforming catalyst dispersed on said 3-dimensional network of substantially non-conductive porous ceramic material, and a fourth solid phase comprised of non-conductive ceramic fibers.

11. The catalytic sheet of claim 10 wherein the ceramic material is alumina.

12. The catalytic sheet of claim 10 wherein the methanol reforming catalyst contains copper as a catalytic metal.

13. The catalytic sheet of claim 12 wherein the methanol reforming catalyst contains both copper and zinc.

14. The catalytic sheet of claim 10 wherein the ceramic fibers are selected from the group consisting of alumina fibers, aluminosilica fibers and aluminaborosilicate fibers.

15. The catalytic sheet of claim 10 wherein there is also present graphitic nanofibers.

16. The catalytic sheet of claim 15 wherein the graphitic nanofibers are comprised of graphite platelets that are aligned parallel, perpendicular or at an angle to the longitudinal axis of the nanofiber.

17. A process for producing catalytic sheets comprised of four solid phases wherein a first solid phase is comprised of a plurality of randomly oriented electrically conductive graphitic carbon fibers, a second solid phase is comprised of a 3-dimensional network of a substantially non-conductive porous ceramic material intermingled with said first solid phase, a third solid phase comprised of a plurality of catalyst particles dispersed on said 3-dimensional network of porous ceramic material and a fourth solid phase comprised of non-conductive ceramic fibers; which process comprises:
  a) providing a porous mat of randomly oriented electrically conductive graphitic carbon fibers;
  b) preparing a blend of an amount of catalyst particles in a dispersing liquid;
  c) passing said blend through said porous mat of electrically conductive graphitic carbon fibers in an amount of time until a predetermined amount of catalyst particles are deposited onto the graphitic carbon fibers of said porous mat;
  d) driving-off substantially all liquid dispersing agent that may be present on said catalyst-containing graphitic carbon fiber mat;
  e) preparing a ceramic sol containing an amount of non-conductive ceramic fiber;
  f) introducing said ceramic sol into an open mold at least as large as said graphitic carbon fiber mat;
  g) submerging said catalyst-containing graphitic carbon fiber mat into said ceramic sol for an amount of time to allow substantially all of said catalyst particles to migrate from said graphitic carbon fibers to said ceramic sol;
  h) driving-off substantially all liquid from step g) above thereby resulting in a 3-dimensional porous network of ceramic material intermingled throughout said carbon fiber mat, which 3-dimensional porous network of non-conductive ceramic material and ceramic fibers now supports substantially all of said catalyst particles;
  i) calcining dried intermingled 3-dimensional porous network of ceramic material and carbon fiber mat of step h) above in an oxygen-containing atmosphere and at a temperature from about 100° C. to about 500° C.; and
  j) subjecting said calcined 3-dimensional porous network of ceramic material and carbon fiber mat of step i) above to a hydrogen-containing atmosphere at a temperature from about 200° C. to about 500° C. for an amount of time to activate substantially all of said catalyst particles, thereby resulting in a catalytic sheet product.

18. The process of claim 17 wherein the dispersing liquid is selected from the group consisting of water and $C_1$ to $C_3$ aliphatic alcohols.

19. The process of claim 17 wherein the catalyst is a methanol reforming catalyst.

20. The process of claim 19 wherein the methanol reforming catalyst contains copper.

21. The process of claim 19 wherein the methanol reforming catalyst contains both copper and zinc.

22. The process of claim 17 wherein the ceramic material is selected from the group consisting of alumina, silica, silica-alumina, titania, and magnesia.

23. The process of claim 22 wherein the ceramic material is alumina.

24. The process of claim 17 wherein the ceramic fibers are selected from the group consisting of alumina fibers, aluminosilica fibers and aluminoborosilicate fibers.

25. The process of claim 17 wherein there is also present graphitic nanofibers.

26. The process of claim 25 wherein the graphitic nanofibers are comprised of graphite platelets that are aligned parallel, perpendicular or at an angle to the longitudinal axis of the nanofiber.

27. The process of claim 17 wherein: i) the catalyst is a methanol reforming catalyst containing both copper and zinc as catalytic metals; and ii) the ceramic material is selected from the group consisting of alumina, silica, silica-alumina, titania, and magnesia.

28. A process for producing catalytic sheets comprised of four solid phases wherein a first solid phase is comprised of a plurality of randomly oriented electrically conductive graphitic carbon fibers, a second solid phase is comprised of a 3-dimensional network of a substantially non-conductive porous ceramic material intermingled with said first solid phase, a third solid phase comprised of a plurality of catalyst particles dispersed on said 3-dimentional network of porous ceramic material, and a fourth solid phase comprised of and non-conductive ceramic fibers; which process comprises:
  a) blending together an amount of catalyst particles for an intended reaction and an amount of electrically conductive graphitic carbon fibers thereby resulting in a blend;
  b) mixing at least a portion of said blend with a dispersing agent thereby resulting in a mixture;
  c) introducing at least a portion of said mixture and a ceramic sol into a mold, which ceramic sol also contains non-conductive ceramic fibers;
  d) driving-off substantially all of any liquid from the mixture thereby resulting in a dried 3-dimensional porous network of non-conductive ceramic material intermingled with randomly dispersed electrically conductive graphitic carbon fibers;
  e) calcining said dried 3-dimensional porous network of ceramic material and graphitic carbon fibers of step d) above in an oxygen-containing atmosphere and at a temperature from about 100° C. to about 500° C.; and
  f) subjecting said calcined 3-dimensional porous network of non-conductive ceramic material/randomly dispersed graphitic carbon fibers of step e) above in a hydrogen-containing atmosphere at a temperature from about 200° C. to about 500° C. for an amount of time to activate substantially all of said catalyst particles, thereby resulting in a catalytic sheet product.

29. The process of claim 28 wherein the catalyst is a methanol reforming catalyst.

30. The process of claim 29 wherein the methanol reforming catalyst contains copper.

31. The process of claim 29 wherein the methanol reforming catalyst contains both copper and zinc.

32. The process of claim 28 wherein the ceramic material is selected from the group consisting of alumina, silica, silica-alumina, titania, and magnesia.

33. The process of claim 32 wherein the ceramic material is alumina.

34. The process of claim 28 wherein the ceramic fibers are selected from the group consisting of alumina fibers, aluminosilica fibers and aluminoborosilicate fibers.

35. The process of claim 28 wherein there is also present graphitic nanofibers.

36. The process of claim 35 wherein the graphitic nanofibers are comprised of graphite platelets that are aligned parallel, perpendicular or at an angle to the longitudinal axis of the nanofiber.

* * * * *